(12) United States Patent
Nixon

(10) Patent No.: US 9,707,631 B2
(45) Date of Patent: Jul. 18, 2017

(54) PLASTIC TUBE FITTING REMOVAL TOOL

(71) Applicant: Ed Nixon, Franklin, NC (US)

(72) Inventor: Ed Nixon, Franklin, NC (US)

( * ) Notice: Subject to any disclaimer, the term of this patent is extended or adjusted under 35 U.S.C. 154(b) by 510 days.

(21) Appl. No.: 14/478,009

(22) Filed: Sep. 5, 2014

(65) Prior Publication Data

US 2016/0067798 A1    Mar. 10, 2016

(51) Int. Cl.
| | | |
|---|---|---|
| B23P 11/00 | (2006.01) | |
| B23D 21/10 | (2006.01) | |
| B26B 17/00 | (2006.01) | |
| B23D 21/02 | (2006.01) | |

(52) U.S. Cl.
CPC ............. *B23D 21/10* (2013.01); *B23D 21/02* (2013.01); *B26B 17/006* (2013.01)

(58) Field of Classification Search
CPC .......... B23Q 3/00; B23Q 3/06; B23Q 13/152; B23Q 7/00
See application file for complete search history.

(56) References Cited

U.S. PATENT DOCUMENTS

| | | |
|---|---|---|
| 45,496 A | 12/1864 | Herbert |
| 86,138 A | 1/1869 | Copeland |
| 198,709 A | 12/1877 | Thornton |
| 259,895 A | 6/1882 | Miller |
| 914,041 A | 3/1909 | Hall |
| 1,371,943 A | 3/1921 | Sperduti |
| 1,442,402 A | 1/1923 | Gunn |
| 1,442,403 A | 1/1923 | Gunn |
| 2,513,438 A | 7/1950 | Weir |
| 2,796,657 A | 6/1957 | Schlueter |
| 3,881,249 A | 5/1975 | Cox, Jr. |
| 5,009,006 A * | 4/1991 | Sawyer ................ H02G 1/1229 30/90.6 |
| 5,586,584 A | 12/1996 | Haldemann |
| 6,769,181 B1 | 8/2004 | Scheuerman et al. |
| 7,210,378 B1 * | 5/2007 | Bibi .......................... B25B 7/02 81/9.4 |
| 8,393,250 B2 | 3/2013 | Schumacher et al. |
| 8,839,506 B2 * | 9/2014 | Slater ................... H01R 43/015 29/268 |

(Continued)

FOREIGN PATENT DOCUMENTS

| | | |
|---|---|---|
| CN | 2584356 Y | 11/2003 |
| CN | 201154496 Y | 11/2008 |
| CN | 202934592 U | 5/2013 |

*Primary Examiner* — Lee D Wilson
(74) *Attorney, Agent, or Firm* — Joseph P. Kincart; Rogers Towers P.A.

(57) ABSTRACT

A hand-held cutting tool to remove a metal fitting ring from the outside surface of plastic tubing. The fitting removal tool comprises a first handle, a second handle, a bridge member, and a cutting blade. The first handle is pivotally connected to a first end of the bridge member by a pivot. The second handle is securely connected to a second end of the bridge member in fixed relation to the bridge member. The bridge member comprises a seat for snugly receiving the outer diameter of the metal fitting ring. The first handle comprises a hand gripping area and a cutting blade positioned between the hand gripping area and the pivot. The cutting blade is configured to make an off center cut in the metal fitting ring such that the underlying plastic tubing is not damaged in the cutting process.

16 Claims, 3 Drawing Sheets

(56) References Cited

U.S. PATENT DOCUMENTS

| | | | |
|---|---|---|---|
| 2008/0256809 A1* | 10/2008 | Macsay | B26B 17/00 30/261 |
| 2012/0060376 A1 | 3/2012 | Polofsky | |
| 2012/0260481 A1* | 10/2012 | Hutchfield | B25B 27/146 29/268 |
| 2013/0000051 A1 | 1/2013 | Cleland | |
| 2016/0067798 A1* | 3/2016 | Nixon | B23D 21/10 30/92.5 |

* cited by examiner

PLASTIC TUBE FITTING REMOVAL TOOL

BACKGROUND

Field of Endeavour

The device described herein generally relates to the field of removal of metal fitting bands or rings from the outside surface of plastic pipes.

Description of Related Art

In recent years has become preferred in the construction industry, especially in plumbing application. Plastic tubing is replacing traditional metal piping in many plumbing, piping, and conduit applications. Plastic tubing provides the advantages of being inexpensive to manufacture, lightweight for construction and shipping purposes, and easy to install due to its pliable and ductile properties. Plastic piping is referenced with different terminology, such as piping, tubing, hose, or other like terms.

A common type of plastic tubing is made of cross-linked polyethylene, commonly abbreviated as "PEX." PEX tubing joints rely on clamps to form a tight seal to prevent leakage. Some of the more common clamps include cinch clamps, crimp rings, band clamps. These clamps and rings are commonly made of bands of metal, such as copper, brass, or some other relatively soft metal.

There are times when a joint must be removed or detached, such as to change a tubing configuration or to correct a misaligned joint or other fabrication error. Removing the metal clamps from the tubing is difficult because the hard, rigid metal bands of the clamp overlay the relatively soft plastic tubing. In many instances, removal of the metal bands causes severe destruction to the tubing, rendering it inoperable for subsequent use. For example, a common cinch clamp removal tool is a rotary tool with a rotary blade, such as the rotary tools made by Dremel® rotary tools made by Robert Bosch Tool Corporation. These rotary tools comprise a circular blade spinning at a high rate to cut through the metal band. However, since the metal band is clamped tightly to the plastic tubing, the band is seated snugly to the surface of the tubing. Cutting the band often results in over penetration by the cutting tool, thus causing damage or even a cut in the plastic tubing.

Other prior art devices use a clamping-style hand held tool to make a cut in the metal band. However, since the soft plastic tubing lies under the metal band, use of these tools often result in crushing the tubing without the cutting tool fully penetrating the metal band. As a result, the plastic tubing is destructively crushed, and the metal band becomes mangled, but in tact.

Other prior art devices, such as the device depicted in U.S. Pat. No. 6,769,181, are oriented to make tangential or off center cuts on the metal band, thereby reducing the magnitude of the crushing force on the underlying plastic tubing. However, these devices are difficult to operate because they are plier-style clamping devices with an open face. In use, it is very difficult to align the cutting blade at a tangential or substantially off center orientation to the metal band and apply the appropriate cutting force without the pipe or tubing slipping out of the open face.

Therefore, what is needed is a hand-held tool for cutting a metal clamping band off of plastic tubing in a manner that is easy and safe to operate, and that provides consistent and effective results without damaging the plastic tubing.

SUMMARY

The device is a hand-held cutting tool for removing a metal fitting ring from the outside surface of plastic tubing. In one embodiment, the fitting removal tool comprises a first handle, a second handle, a bridge member, and a cutting blade. The first handle is pivotally connected to a first end of the bridge member by a pivot. The second handle is securely connected to a second end of the bridge member in fixed relation to the bridge member.

The bridge member comprises a seat for snugly receiving the outer diameter of the metal fitting ring. The first handle comprises a hand gripping area and a cutting blade positioned between the hand gripping area and the pivot. In one embodiment, the cutting blade is a detachable member that is removably attached to the first handle. In this embodiment, the first handle further comprises a recess for receiving the detachable cutting blade.

In use, the first handle and second handle are spread apart, and one of the handles is placed over the plastic tubing. The fitting ring is thus disposed between the bridge member and the cutting blade. In one embodiment, the cutting blade is configured to cut the metal fitting ring on the side of the metal fitting ring opposite the side in contact with the bridge member. The first handle is then depressed such that the first handle rotates at the pivot in relation to the bridge member until the tip of the cutting blade contacts the metal fitting ring. In another embodiment of the cutting tool, the cutting blade is oriented such that the tip contacts the metal fitting ring at a location between the plastic tubing and the pivot.

DETAILED DESCRIPTION OF THE PREFERRED EMBODIMENTS

With reference to the drawings, the invention will now be described with regard for the best mode and the preferred embodiment. In general, the device disclosed herein is a hand-held tool for cutting a metal fitting band off of plastic tubing without damaging the plastic tubing. The embodiments disclosed herein are meant for illustration and not limitation of the invention. An ordinary practitioner will appreciate that it is possible to create many variations of the following embodiments without undue experimentation.

Figure 1:
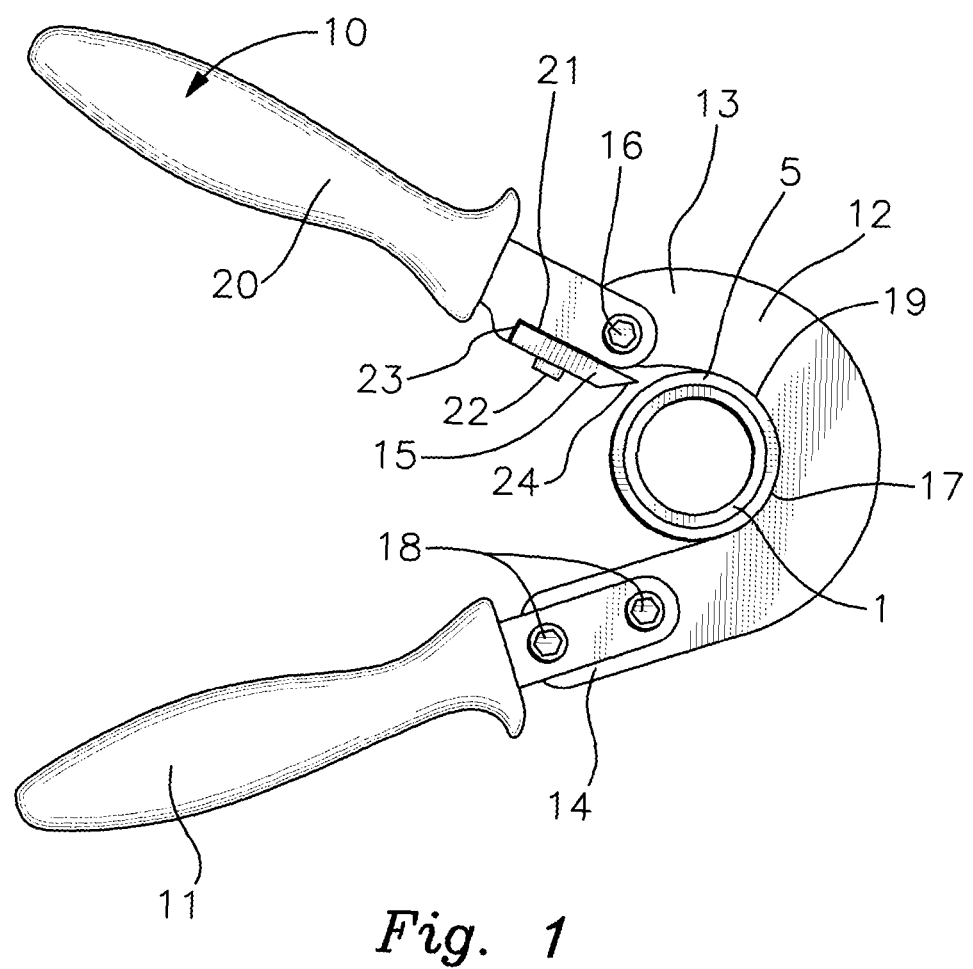
FIG. 1 is a side view of one embodiment of the cutting tool placed around a metal fitting ring of plastic tubing.
Figure 2:
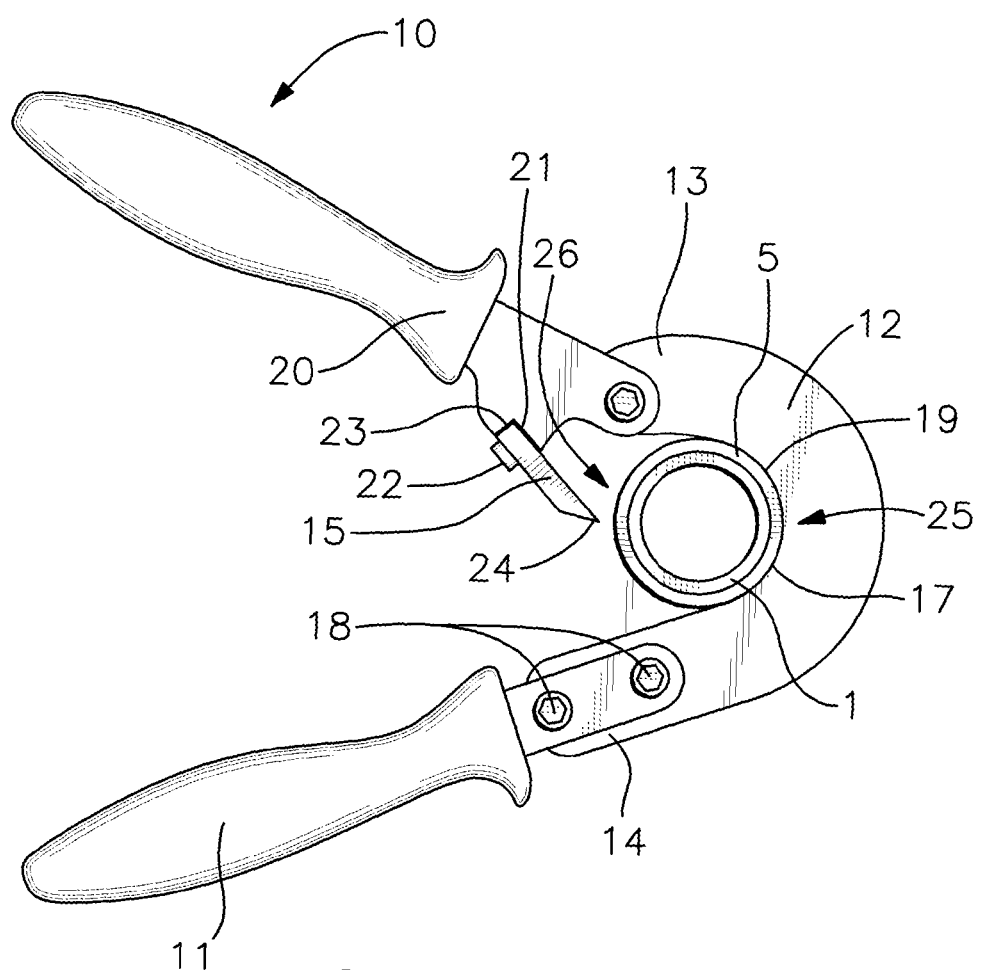
FIG. 2 is a side view of one embodiment of the cutting tool placed around a metal fitting ring of plastic tubing.

Referring to FIGS. 1 and 2, the device is a hand-held cutting tool, or fitting removal tool, to remove a metal fitting ring 5, such as a crimp ring or clamp ring, from the outside surface of plastic tubing 1. The metal fitting ring 5 is typically a metal band made of brass, copper, or some other soft metal. In one embodiment, the fitting removal tool comprises a first handle 10, a second handle 11, a bridge member 12, and a cutting blade 15. Generally, the first handle 10 is pivotally connected to a first end 13 of the bridge member 12 by a pivot 16. The pivot 16 permits the first handle 10 to rotate freely with respect to the bridge member 12, much like the pivot in an ordinary pair of pliers. The second handle 11 is securely connected to a second end 14 of the bridge member 12 in fixed relation to the bridge member. The second handle 11 could be integral with the bridge member 12, or secured to the bridge member 12 by a suitable connection, such as by one or more mechanical fasteners 18.

The bridge member 12 comprises a seat 17 for snugly receiving the outer diameter of the metal fitting ring 5. The seat 17 has a concave surface 19 in the shape of a circular arc with a radius approximately the same size as the radius of the circular metal fitting ring 5. The plastic tubing 1 and metal fitting rings 5 are often manufactured in standard sizes. The radius of the curve of the concave surface 19 is selected such that a standard sized fitting will snugly fit inside the seat 17 of the bridge member 12. This snug seating of the metal fitting ring 5 securely retains the fitting ring 5 during the cutting process. A snug fit between the outside surface of the metal fitting ring 5 and the concave surface 19 ensures that the metal fitting ring 5 will receive adequate support and securement in reaction to the large forces applied to the metal fitting ring 5 during the cutting process. The concave surface 19 faces a direction between the first handle 10 and the second handle 11.

The first handle 10 comprises a hand gripping area 20 and a cutting blade 15 positioned between the hand gripping area 20 and the pivot 16. In one embodiment (not shown), the cutting blade 15 is integral with the first handle 10. In another embodiment, the cutting blade 15 is a detachable member that is removably attached to the first handle 10. This embodiment is convenient for applications where the cutting blade 15 frequently becomes dull and needs to be replaced or sharpened. In this embodiment, the first handle 10 can further comprise a recess 21 for receiving the detachable cutting blade 15. The cutting blade 15 is seated in the recess 21 and removably secured to the recess 21 by a mechanical anchor 22.

In one embodiment, the recess 21 comprises a backstop 23 configured to abut the cutting blade 15 in an axial direction to provide axial support to the cutting blade 15 during the cutting motion. The axial direction of the cutting blade 15 is substantially parallel to the compressive force vector of the cutting blade 15 during the cutting process. When the tip 24 of the cutting blade 15 contacts and penetrates the metal fitting ring 5, large axial forces are transferred into the cutting blade 15. These forces can become so large that the securement force provide by the mechanical anchor 22 is approached or even exceeded. Under these circumstances, the cutting blade 15 abuts the backstop 23 in the axial direction, which provides additional axial support to the cutting blade 15.

In use, the first handle 10 and second handle 11 are spread apart, and one of the handles 10, 11 is placed over the plastic tubing 1. The cutting tool is adjusted such that the metal fitting ring 5 is seated in the concave surface 19 of the seat 17 in the bridge member 12. The fitting ring 5 is thus disposed between the bridge member 12 and the cutting blade 15. The concave surface 19 of the seat 17 is configured to snugly contact a first side 25 of the surface of the metal fitting ring 5. In one embodiment, as shown in FIG. 2, the cutting blade 15 is configured to cut the metal fitting ring 5 on a second side 26 of the metal fitting ring 5. The first handle 10 is then depressed such that the first handle 15 rotates at the pivot 16 in relation to the bridge member 12. The first handle 10 continues to rotate until the tip 24 of the cutting blade 15 contacts the metal fitting ring 5. The cutting blade 15 exerts a force on the fitting ring 5, and this force is resisted by the bridge member 12 while the tip 24 penetrates the metal fitting ring 5 to make the cut. In some embodiments, the tip 5 will pull the metal fitting ring 5 apart by partially cutting and partially tearing the metal fitting ring 5.

In one embodiment of the cutting tool, the cutting blade 15 is oriented such that the tip 24 contacts the metal fitting ring 5 at a location between the plastic tubing 1 and the pivot 16. In this embodiment, the tip 24 has an arc radius of rectilinear curvature that is smaller than that of the embodiment shown in FIG. 2. Therefore, the embodiment shown in FIG. 1 provides the additional advantage of maximizing mechanical leverage since the hand force applied to the first handle 10 is more advantageously transferred into a penetrating force of the tip 24 in the cutting blade 15.

Figure 3:
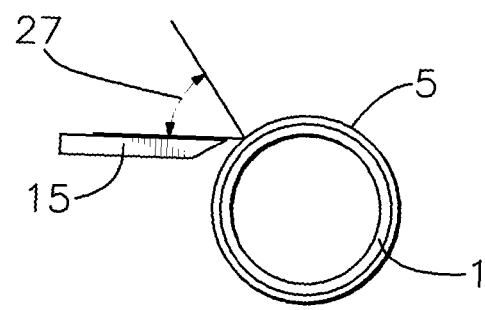
FIG. 3 is a cross section of a metal fitting ring clamped to plastic tubing, showing the penetration angle in relation to perpendicular of the cutting blade during an off center cut.

In the foregoing embodiments, the cutting blade 15 is oriented to make a substantially off center or tangential cut in the metal fitting ring 5 when the metal fitting ring 5 is placed in the seat 17 and the first handle 10 is depressed toward the second handle 11. The off center orientation of the cutting blade 15 means that the compressive force vector applied to the metal fitting ring 5 by the tip 24 is not perpendicular or substantially perpendicular to the surface of the metal fitting ring 5 at the point where the tip 25 contacts the ring 5. The angle 27 of the compressive force vector should be at least 30 degrees, and preferably more than 45 degrees, as shown in FIG. 3. The angle 27 of the compressive force vector ensures that the cut in the metal fitting ring 5 is sufficiently off center so that the metal fitting ring 5 can be removed from the plastic tubing 1 without causing substantial damage to the plastic tubing 1.

The purpose of the off center cut in the metal fitting ring 5 is that the compressive force vector caused by the cutting blade minimizes the crushing force ultimately applied to the underlying plastic tubing 1. The off center orientation of the cutting blade 15 also ensures that any over penetration of the tip 24 of the cutting blade 15 will not cause substantial damage to the plastic tubing 1, such as by piercing or tearing the wall of the plastic tubing 1.

Figure 4:
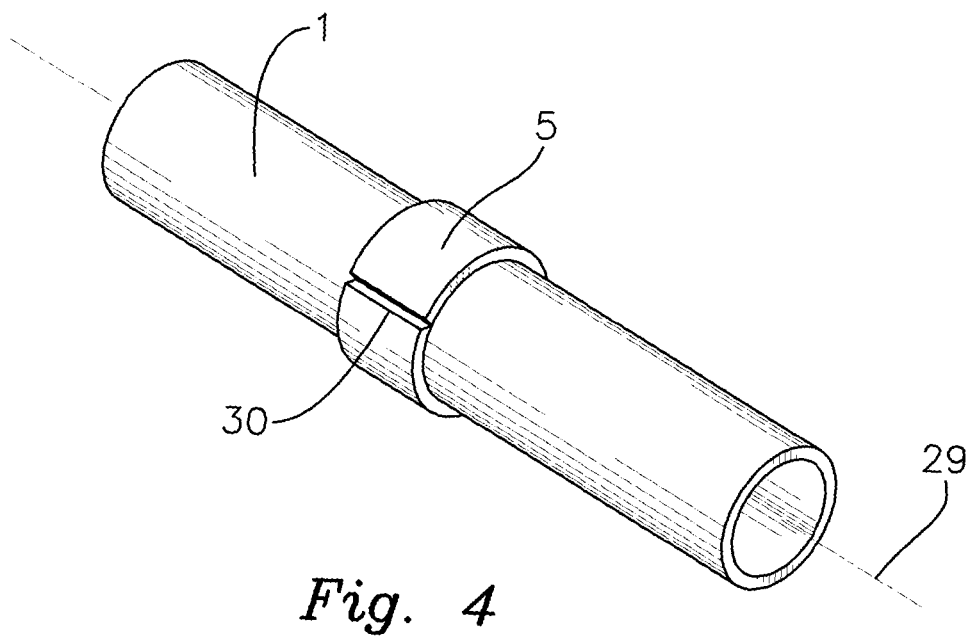
FIG. 4 is an isometric view of a typical plastic tubing segment having a metal fitting ring attached to it.

In another embodiment, shown in FIG. 4, the plastic tubing 1 has a longitudinal axis 29 along its length. The cutting blade 15 is oriented to make a cut 30 in the metal fitting ring 5 that is substantially parallel to the longitudinal axis 29.

Since the cutting blade 15 is used for repeatedly cutting the metal fitting rings 15, it is preferable, but not required, that the cutting blade 15 is made of hardened metal, such as hardened or tempered steel.

The foregoing embodiments are merely representative of the hand-held cutting tool, and embodiments presented are not meant for limitation of the invention. Consequently, it is understood that equivalents and substitutions for certain elements and components set forth above are part of the device described herein, and the true scope of the invention is set forth in the claims below.

I claim:

1. A hand-held tool for removing a circular metal fitting ring or clamp ring from the outside surface of plastic tubing, said tool comprising:
    a first handle and a second handle, the first handle comprising a cutting blade having a tip; and
    a bridge member having a first end, a second end, and a seat, the seat having a concave surface in the shape of a circular arc with a radius approximately the same size as the radius of the circular metal fitting ring, the concave surface facing a direction between the first handle and the second handle;
    wherein the first handle is rotatably connected by a pivot to the first end of the bridge member, the second handle is securely connected in fixed relation to the second end of the bridge member, and the cutting blade is oriented to make an off center cut in the metal fitting ring when the metal fitting ring is placed in the seat and the first handle is depressed toward the second handle; and wherein the cutting blade is configured to make the off center cut in the metal fitting ring at a location between the plastic tubing and the pivot.

2. The tool in claim 1, wherein the plastic tubing has a longitudinal axis and the cutting blade is further oriented to install the off center cut the metal fitting ring at an orientation that is substantially parallel to the longitudinal axis.

3. The tool in claim 1, wherein the cutting blade is detachable from the first handle, and the first handle further comprises a recess for receiving and detachably securing the detachable cutting blade.

4. The tool in claim 2, wherein the cutting blade is detachable from the first handle, and the first handle further comprises a recess for receiving and detachably securing the detachable cutting blade.

5. The tool in claim 3, wherein the recess further comprises a backstop configured to abut the cutting blade in an axial direction of the cutting blade.

6. The tool in claim 4, wherein the recess further comprises a backstop configured to abut the cutting blade in an axial direction of the cutting blade.

7. A hand-held tool for removing a circular metal fitting ring from the outside surface of plastic tubing, said tool comprising:

a first handle and a second handle, the first handle comprising a cutting blade having a tip; and a bridge member having a first end, a second end, and a seat, the seat having a concave surface in the shape of a circular arc with a radius approximately the same size as the radius of the circular metal fitting ring, the concave surface facing a direction between the first handle and the second handle;

wherein the first handle is rotatably connected by a pivot to the first end of the bridge member, the second handle is securely connected in fixed relation to the second end of the bridge member, and the cutting blade is oriented to make an off center cut in the metal fitting ring when the metal fitting ring is placed in the seat and the first handle is depressed toward the second handle.

8. The tool in claim 7, wherein the concave surface of the seat is configured to snugly contact a first side of the surface of the metal fitting ring, and the cutting blade is configured to cut the metal fitting ring on a second side of the metal fitting ring.

9. The tool in claim 7, wherein the plastic tubing has a longitudinal axis and the cutting blade is further oriented to install the off center cut the metal fitting ring at an orientation that is substantially parallel to the longitudinal axis.

10. The tool in claim 7, wherein the cutting blade is detachable from the first handle, and the first handle further comprises a recess for receiving and detachably securing the detachable cutting blade.

11. The tool in claim 8, wherein the plastic tubing has a longitudinal axis and the cutting blade is further oriented to install the off center cut the metal fitting ring at an orientation that is substantially parallel to the longitudinal axis.

12. The tool in claim 8, wherein the cutting blade is detachable from the first handle, and the first handle further comprises a recess for receiving and detachably securing the detachable cutting blade.

13. The tool in claim 9, wherein the cutting blade is detachable from the first handle, and the first handle further comprises a recess for receiving and detachably securing the detachable cutting blade.

14. The tool in claim 10, wherein the recess further comprises a backstop configured to abut the cutting blade in an axial direction of the cutting blade.

15. The tool in claim 12, wherein the recess further comprises a backstop configured to abut the cutting blade in an axial direction of the cutting blade.

16. The tool in claim 13, wherein the recess further comprises a backstop configured to abut the cutting blade in an axial direction of the cutting blade.

* * * * *